Jan. 9, 1923.
W. CLARK.
ELECTRICAL RESISTANCE.
FILED AUG. 3, 1921.
1,441,399
2 SHEETS-SHEET 1
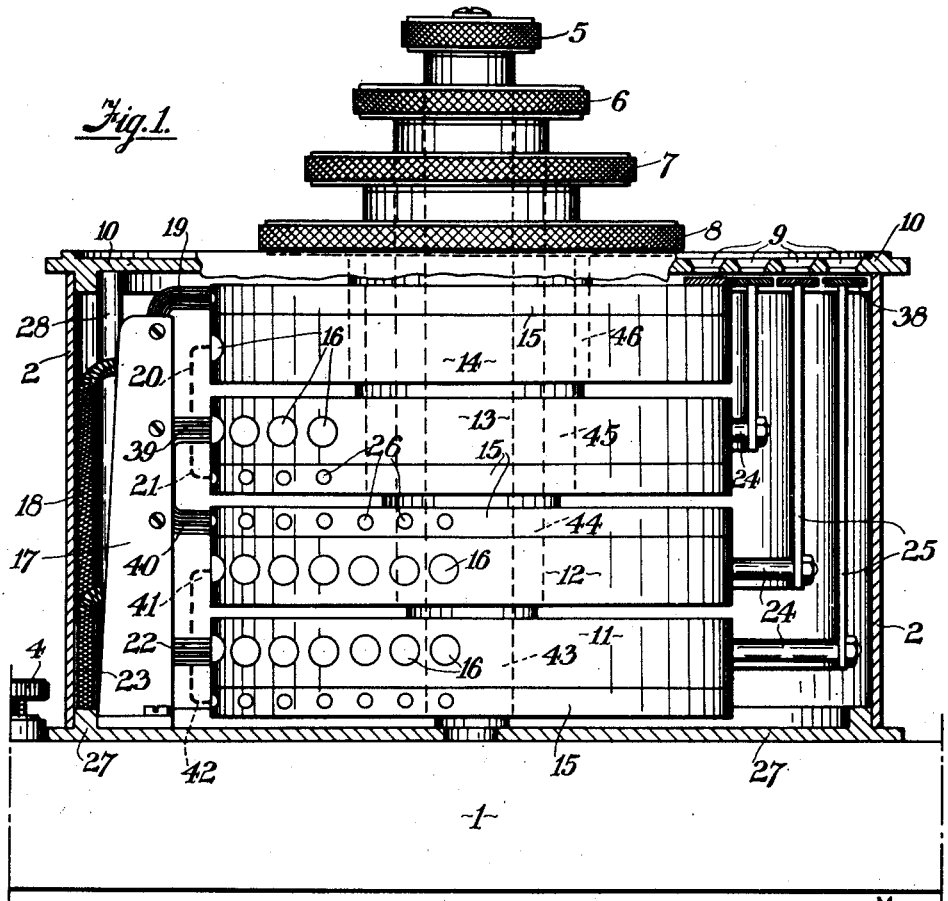
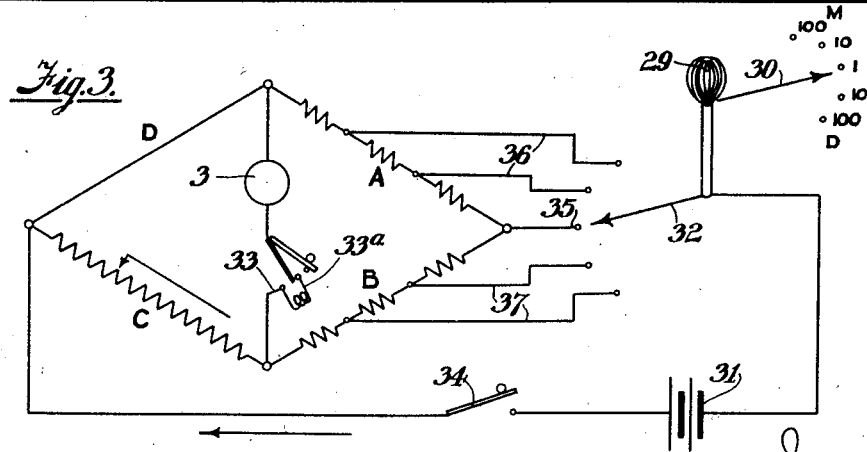

Jan. 9, 1923. 1,441,399
W. CLARK.
ELECTRICAL RESISTANCE.
FILED AUG. 3, 1921. 2 SHEETS-SHEET 2

Patented Jan. 9, 1923.

1,441,399

UNITED STATES PATENT OFFICE.

WILLIAM CLARK, OF LONDON, ENGLAND.

ELECTRICAL RESISTANCE.

Application filed August 3, 1921. Serial No. 489,611.

*To all whom it may concern:*

Be it known that I, WILLIAM CLARK, a subject of the King of Great Britain, residing at 53 Victoria Street, London S. W. 1, England, have invented new and useful Improvements in and Relating to Electrical Resistances, of which the following is a specification.

This invention relates to variable electrical resistances and more particularly to variable resistances used for measuring other resistances such as that known, when employed in co-related order, as the Wheatstone bridge.

In some Wheatstone bridges as hitherto constructed a large number of plugs have been employed the removal of any one of which introduced a resistance of known value into the variable "arm" of the bridge or the ratio arms. This arrangement however, is subject to the disadvantages that not only are the plugs liable to become misplaced, but no direct visible indication is given of the total value of the resistances in circuit at any given time and consequently calculations are necessary when the galvanometer indicates that the resistance under test is balanced by the variable resistance.

The object of the present invention is to provide an improved electrical resistance of the rheostat, Wheatstone bridge or allied type which has no parts requiring removal during operation, which gives a visual indication automatically of the total value of the resistances in circuit at any given time, and which can be quickly and simply operated.

The invention consists, briefly stated, in a variable electrical resistance comprising a number of concentrically mounted elements rotatable to increase or decrease the total value of the variable resistance and having means for giving a visual indication of the total resistance in circuit at any given time.

Reference will now be made to the accompanying drawings in which:—

Figure 1 is an elevation partly in section of a device constructed in accordance with the invention.

Figure 3 is a diagram of the electrical connections.

Figure 2:
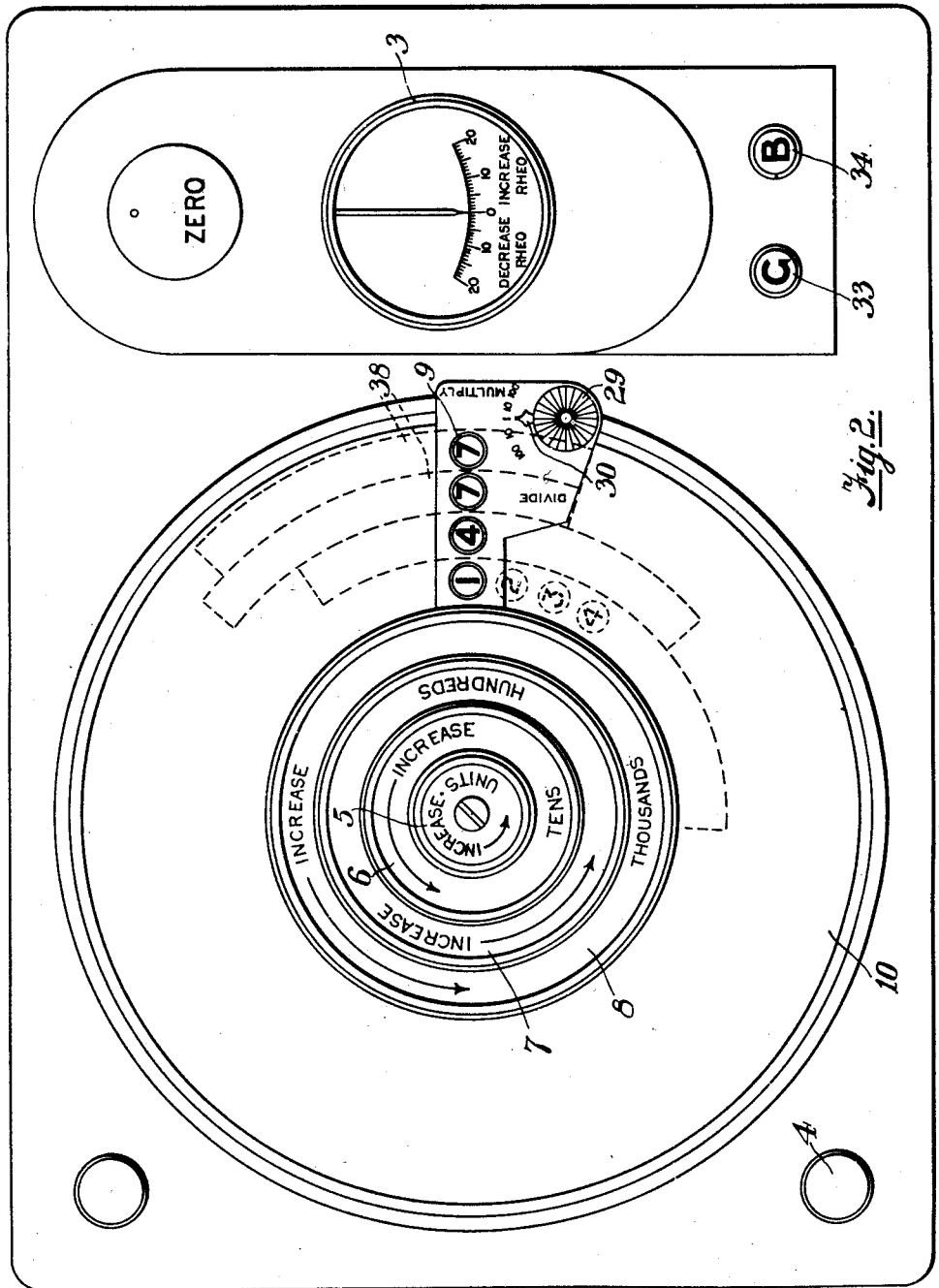
Figure 2 is a plan of the device shown in Figure 1.

The apparatus comprises a base 1 upon which is mounted a cylindrical casing 2 containing the variable resistance hereinafter described, a galvanometer 3 and terminals 4 to which a resistance to be tested is connected.

Adjustment of the variable resistance is effected by means of a series of knurled or milled hand setting wheels 5, 6, 7 and 8 superimposed above the casing 1 and serving respectively for adjustments in units, tens, hundreds and thousands or otherwise, an indication of the resistance in circuit at any time being given through openings 9 formed in the cover 10 of the casing 1 closely adjacent the hand wheels. The latter are mounted on concentric spindles or tubes shown in dotted lines 43, 44, 45 and 46 the lower ends of which carry drums 11, 12, 13, 14 adapted to rotate respectively with the wheels 5, 6, 7 and 8. Each drum, for convenience in manufacture and assembly is preferably made of standard design and is provided in the form shown with a contact ring 15 and a number of circular contact plates 16 between each pair of which a resistance is disposed of known value.

A standard 17 carries brushes connecting the contacts of the various drums while from a suitable source of current supply disposed in the base 1 current passes by the lead 18 to the brush 19 and thence to the drum 14 with the ring 15 on which the brush 19 is in permanent contact. A pair of brushes 20 and 21 (shown in dotted lines, Figure 1) carried by a second standard similar in construction to the standard 17 connect the contact plates on the drum 14 with the ring on the drum 13. This arrangement is repeated for the remaining drums by brushes 39 and 40 carried by the standard 17 and connecting plates 16 on drum 13 to ring 15 on drum 12 and by brushes 41 and 42 (shown in dotted lines) connecting plates 16 on drum 12 with ring 15 on drum 11, and the arrangement is such that in effect current always enters by the contact ring, passes through as many resistances in each drum as are in circuit and passes through the contact plates and brushes to the next ring below, finally returning through the brush 22 and lead 23 to the battery.

The drums 11, 12 and 13 are each provided with an arm 24 to which is secured an upright 25 carrying at the top a partially circular plate 38 bearing a set of numerals from 1 to 9 and 0 while the drum 14 carries a similar set on its upper surface. Rotary movement of the drums through the medium of any or all of the hand setting wheels 5—8 to increase or decrease the variable resistance causes these numerals to appear successively beneath the openings 9 in the cover 10 and give an exact indication at any time of the strength of the resistance in circuit. Suitable means are provided to maintain the drums in any adjusted position, these means comprising in one form small hemispherical depressions 26 adapted to be engaged by spring urged spherical ended plungers or balls carried in a suitable standard.
Movement of the drums in either direction is limited by a pair of posts which engage the arms 24 and a similar arm formed for the purpose on the drum 14.

The various standards and posts above referred to are all secured in or to a base plate 27 mounted on the base 1 and which also carries columns 28 supporting the cover 10.

A knob or button 29 is disposed closely adjacent the openings 9 and is used in multiplying or dividing, a pointer 30 indicating the exact position of the switch hereinafter described which is controlled by the button.

The electrical connections employed are illustrated in Figure 3 wherein A and B constitute the arms of known and equal resistance, C is the variable resistance and represents at the maximum the total strength of the resistance coils enclosed in the drums 11—14. D is the resistance to be tested and which is connected in practice to the terminals 4. The galvanometer 3 is connected in the usual manner while the battery 31 is connected to C and D and to a five way switch 32 operated by the button 29 above described. The usual galvanometer and battery keys 33 and 34 (see also Figure 1) are provided for closing the circuit.

The switch 32 comprises a brush and five ratio contacts of which 35 is the one used for normal operations while either of the contacts 36 connected by suitable leads to the arm A is used for dividing and either of the contacts 37 connected to arm B for multiplying.

The switch 33 may be so connected that its first movement is to introduce a resistance 33ª into the circuit to prevent damage to the galvanometer when dealing with totally unknown resistances to be tested. Should the needle movement be feeble the switch may be further moved cutting out the resistance and allowing the full current to pass through the galvanometer. If, however, with the resistance 33ª in circuit there should be considerable galvanometer movement further resistances require insertion in the variable circuit to bring the balance nearer zero.

The invention is not limited to the actual details of construction described and shown as, for example, any desired number of resistance drums may be employed.

Further, flat plates or discs may replace the drums in which case the plates or discs may be stationary and the brushes may be carried by the concentric spindles or tubes for adjustment by the hand setting wheels.

According to another arrangement the drums, plates or the like may be arranged all in one plane and operated by suitable gearing from pinions carried at the lower ends of the concentric spindles or tubes.

I claim:—

1. In a variable electrical resistance, a number of superposed concentric hand setting wheels mounted upon concentric spindles or tubes carrying resistances or brushes movable over stationary resistances and means for giving a visual indication of the total value of resistance in circuit according to the positions of said hand setting wheels.

2. In an electrical resistance, a number of rotatable drums each containing resistances of different unitary strength for each drum, means for maintaining continuous electrical connection between said drums and with a source of electric current supply, means whereby partial rotation of any or all of said drums varies the strength of the whole resistance, and means for giving a visual indication of the total value of resistance in circuit.

3. A variable electrical resistance comprising a number of concentric rotatable resistance members of differing unitary resistance values, means for maintaining continuous electrical connection between said members in all positions of adjustment, and means for giving a visual indication of the total value of resistance in circuit.

4. In a variable electrical resistance, a number of superimposed concentric hand setting wheels mounted upon concentric spindles, a casing into which said spindles extend, a number of drums each containing resistances of different unitary value for each drum mounted upon said spindles, means for maintaining continuous electrical connection between said drums and with a source of electric current supply, means whereby partial rotation of any or all of said hand setting wheels varies the strength of the whole resistance, and means for giving a visual indication of the total value of resistance in circuit.

5. In a variable electrical resistance, a number of concentric rotatable resistance members of differing unitary resistance value, means for manually adjusting each of said rotatable members independently, and means for maintaining continuous electrical connection between said members in all positions of adjustment.

6. In a variable electrical resistance a number of concentric rotatable resistance members of differing unitary resistance values, means for manually adjusting each of said rotatable members independently, means for maintaining continuous electrical connection between said members in all positions of adjustment, and means for giving a visual indication of the total value of resistance in circuit.

7. In an electrical resistance, a casing, a number of superimposed concentric hand setting wheels disposed externally of said casing, concentric spindles carrying said wheels and extending into said casing, a number of drums mounted upon said spindles, a plurality of contact plates arranged around the periphery of each drum, resistances of different unitary strength for each drum arranged between each pair of contact plates, a contact ring surrounding the periphery of each drum, a brush making contact with the ring and the drum of highest unit resistance and connected to the positive pole of a source of electric current brushes connecting the contact plates of each drum with the contact ring of the next succeeding drum, a brush engaging the contact plates on the drum of lowest unit resistance, and connected to the negative pole of the source of electric current supply, and means operated by said drums for giving an indication visible externally of said casing of the total value of resistance in circuit.

8. In an electrical resistance, a number of superimposed concentric hand setting wheels mounted upon concentric spindles carrying brushes movable over stationary resistances means for obtaining a multiplication or division of the resistance and means for giving a visual indication of the total value of resistance in circuit according to the positions of said hand setting wheels.

9. In an electrical resistance, a number of rotatable drums each containing resistances of different unitary strength for each drum, means for maintaining continuous electrical connection between said drums and with a source of electric current supply, means whereby partial rotation of any of said drums varies the strength of the whole resistance and means for obtaining a multiplication or division of the resistance in circuit.

10. In an electrical resistance, a casing, a number of superimposed concentric hand setting wheels disposed externally of said casing, concentric spindles carrying said wheels and extending into said casing, a number of drums mounted upon said spindles, a plurality of contact plates arranged around the periphery of each drum, resistances of different unitary strength for each drum arranged between each pair of contact plate means for maintaining continuous electrical connection between said drums and with a source of electric current supply, a five way switch for obtaining a multiplication or division of the resistance of said drums, and means operated by said drums for giving an indication visible externally of said casing of the total value of resistance in circuit.

11. In an electrical resistance, a casing, a number of superimposed hand setting wheels disposed externally of said casing, concentric spindles carrying said wheels and extending into said casing, four superimposed drums mounted upon said spindles and serving respectively for increases in units, tens hundreds and thousands, a plurality of contact plates arranged around the periphery of each drum, a contact ring surrounding the periphery of each drum, a brush making contact with the ring on the drum of the highest unit resistance and connected to the positive pole of a source of electric current supply brushes connecting the contact plates of each drum with the contactoring of the next succeeding drum, a brush engaging the contact plates on the drum of lowest unit resistance and connected to the negative pole of the source of electric current supply, a five way switch for obtaining a multiplication or division of the resistance of said drums, a galvanometer key including a resistance brought into circuit during the initial movement of the key and subsequently cut out, dial plates carried by said drums, and a window in said casing through which one numeral on each plate is always visible.

In witness whereof I affix my signature.

WILLIAM CLARK.